March 31, 1964   A. H. KELLER ETAL   3,126,690
CORN PICKING AUXILIARY EAR DETACHING APPARATUS
Filed Feb. 26, 1962   3 Sheets-Sheet 1

INVENTORS
Arthur H. Keller
Elof K. Karlsson
Paul O. Pippel
Atty.

March 31, 1964 A. H. KELLER ETAL 3,126,690
CORN PICKING AUXILIARY EAR DETACHING APPARATUS
Filed Feb. 26, 1962 3 Sheets-Sheet 2

INVENTORS
Arthur H. Keller
Elof K. Karlsson
Atty.

March 31, 1964   A. H. KELLER ETAL   3,126,690
CORN PICKING AUXILIARY EAR DETACHING APPARATUS
Filed Feb. 26, 1962   3 Sheets-Sheet 3

INVENTORS
Arthur H. Keller
Elof K. Karlsson
Paul O. Pippel
Atty.

United States Patent Office 3,126,690
Patented Mar. 31, 1964

3,126,690
CORN PICKING AUXILIARY EAR DETACHING
APPARATUS
Arthur H. Keller, Western Springs, and Elof K. Karlsson,
East Moline, Ill., assignors to International Harvester
Company, Chicago, Ill., a corporation of New Jersey
Filed Feb. 26, 1962, Ser. No. 175,547
5 Claims. (Cl. 56—107)

This invention is directed to a novel corn picking apparatus, and more particularly to such an apparatus which includes an occlusion means cyclically movable to correspondingly vary the effective feeding area above the snapping rolls.

As a corn picking or harvesting machine is directed through a field of standing corn, the first operation which must be performed is the picking or removal of the ears of corn from the stalks. For many years the initial separation of the ears from the stacks was accomplished by providing a pair of generally cylindrical snapping rolls, aligned parallel to each other and rotated in opposite directions. Such rolls have been generally positioned in inclined fashion, extending downwardly and forwardly to a postion near the ground plane. The direction of rotation of such rolls is such that the peripheral portion of each roll is moving downwardly as such portion passes adjacent the other roll. Thus, as the corn picking apparatus proceeds along the row, the lower portion of each stalk passes between the pair of rolls at the forward portions thereof. The rolls are provided with "aggressive" material on at least portions thereof, thereby to grasp the stalks and in effect pull them downwardly between the pair of rolls. "Aggressive" refers in general to the degree of frictional engagement of the roll surface with the corn stalk. Thus a material such as rubber is more aggressive than is steel or another metal.

The pair of snapping rolls has been produced with a variety of different surface configurations to offer a more or less aggressive surface to the stalks. As the rolls were made more aggressive to effect a more positive feeding of the stalks therethrough, there was likewise produced a corresponding tendency to grap the butt of the ear and effect some shelling and/or bruising of the ear at the stripping rolls.

In an attempt to minimize the shelling and thus to correspondingly reduce the waste at the stripping rolls, stripper plates were positioned over and substantially parallel to the snapping rolls. The stripper plates essentially are a pair of flat plates spaced apart to define therebetween a material feeding slot, the lateral extent of which is usally fixed inasmuch as each of the stripper plates is supported in a fixed position. Occasionally an adjustment for the position of one stripper plate has been provided, but it is necessary to make such adjustment with the equipment deenergized, so that there is always a constant lateral extent of the material feeding slot when the equipment is operating. The spacing of the stripper plates is such as to allow a stalk to easily pass through the slot to be gripped by the snapping rolls, but the slot is sufficiently narrow so that the ears of corn could not pass therebetween. Accordingly the erstwhile snapping rolls are sometimes termed stalk feeding rolls inasmuch as the stripping or snapping of the ears from the stalk occurs as the ear encounters the stripper plates. Although such a construction has the desirable result of reducing the amount of shelling at the point where the ear is separated from the stalk, nevertheless in certain conditions such as the encountering of great numbers of broken stalks or down stalks, such stalks will not enter the material feeding slot, thereby overloading the ancillary cleaning devices on the equipment to the extent that continued picking is not possible. Therefore the first system, that of utilizing a pair of not overly aggressive snapping rolls to "wring" the stalks therethrough in picking, and the second system, that of providing a pair of stripper plates over a set of considerably more aggressive feeding rolls, each has its advantages, and its accompanying disadvantages.

It is therefore a principal object of the present invention to provide a corn picking apparatus which affords the advantages of each of the two just-described systems without the accompanying disadvantages of those arrangements.

An important object of the invention is the provision of an unobvious corn picking arrangement which both minimizes the undesirable shelling of corn at the picking location and also permits the efficient operation of the unit under a variety of picking conditions.

A salient object of the invention is the provision of such a corn picking unit which embodies the advantages of continuous adjustment of the lateral extent of the material feeding slot.

The foregoing and other objects of the invention are realized, in a preferred embodiment thereof, by providing a corn picking apparatus comprising a first roll and means, including a second roll positioned adjacent the first, for defining a material feeding slot of given lateral extent. An occlusion means, which may be the only stripper plate, or one of a pair of stripper plates, is positioned adjacent one of the rolls and disposed for movement to effectively vary the lateral extent of the material feeding slot as a function of such movement. Also provided is means for cyclically varying the position of the occlusion means, thus producing a related cyclical variation in the effective lateral extent of the material feeding slot. It is this cyclical variation in the effective slot extent which secures the benefits both of the machines using stripper plates and those constructed without stripper plates, while substantially avoiding the less desirable features of each of those constructions.

The best mode contemplated for carrying out the invention will now be described. To enable those skilled in the art to make and use the invention, such description is set forth in connection with the accompanying drawings, in the several figures of which like reference numerals identify like elements, and in which.

*Structure of the Invention*

Figure 1:
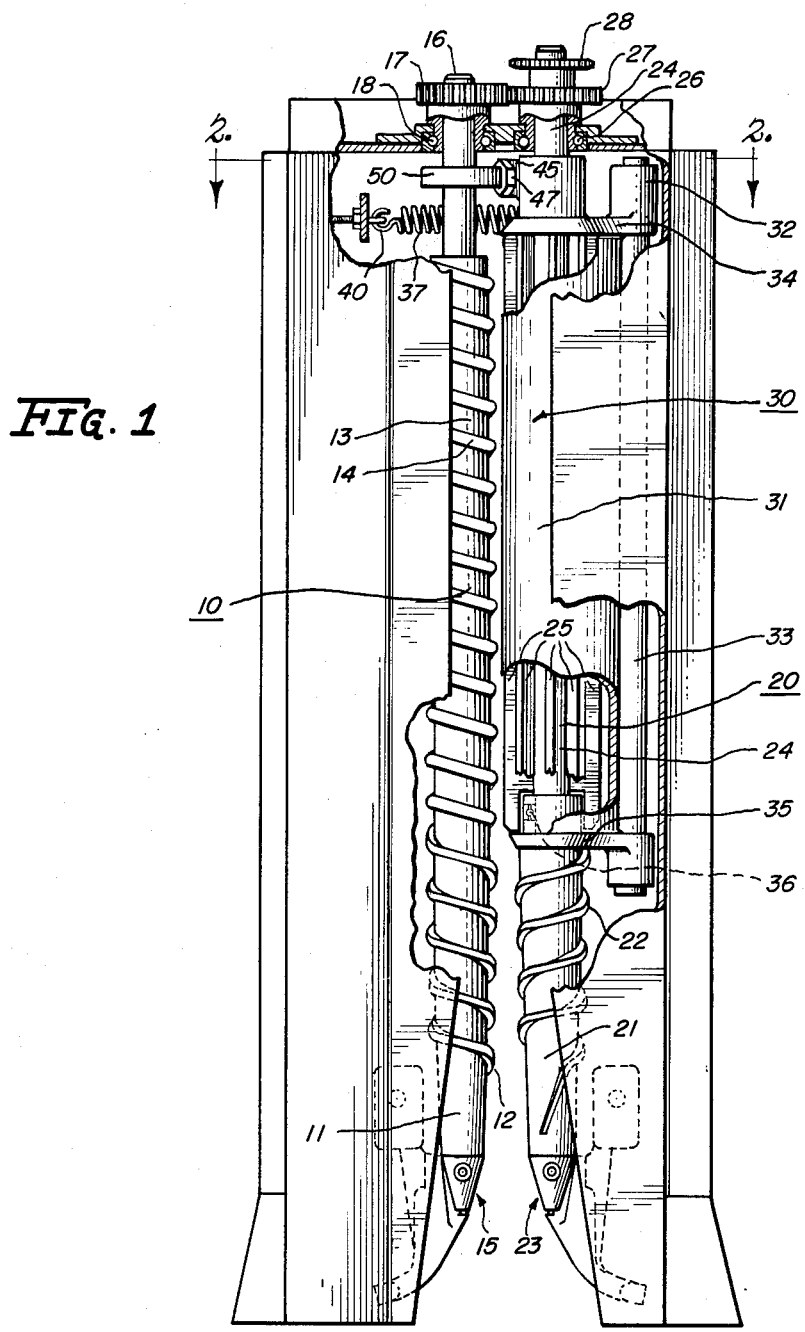
FIGURE 1 is a plan view, partly broken away, depicting a first embodiment of a corn picking apparatus constructed in accordance with the inventive principles.

As shown in FIGURE 1, the environment for this embodiment of the invention includes components such as a guide roll 10 which comprises a frontal portion 11 having a helical guide rib 12 affixed thereon, and a rear portion 13 which also has a helical rib 14 continuously wound around and affixed thereto. The extremity of frontal portion 11 is supported and journaled in a stationary point arrangement 15, which may be a stud-and-bracket arrangement as illustrated. A shaft portion 16 extends from the rear of roll 10, and a spur gear 17 is affixed to the rear of shaft 16. Support for the rear portion of roll 10 is provided by a bearing support unit 18 affixed to the supporting frame and surrounding the rear portion of shaft 16.

Adjacent and substantially parallel to roll 10 another roll 20 is positioned. This second roll includes a forward portion 21 on which a helical rib 22 is affixed, in a manner similar to that of the related structure on roll 10. An analogous mounting arrangement is also provided for the frontal portion, with shaft 21 being supported in a stationary point unit 23. Roll 20 further comprises a central shaft 24 on which a plurality of radial fins or ribs 25 are affixed, to provide an aggressive exterior surface for the central portion of roll 20. The rear portion of shaft 24 is journaled and supported in a bearing unit 26, and a spur gear 27 is affixed rearwardly thereof in meshing engagement with the similar spur gear 17 at the rear of roll 10. A sprocket 28 affixed to the rear of shaft 24 provides an indexing means over which a drive chain or other analogous drive unit (not shown) may be indexed to provide rotary drive from any of the plurality of sheaves, pulleys, and sprockets in a corn picker unit. Responsive to the application of such rotary drive energy, shaft 24 is itself rotated and, over the driving connection between spur gears 27 and 17, a corresponding but oppositely directed rotation of roll 10 is provided.

Figure 2:
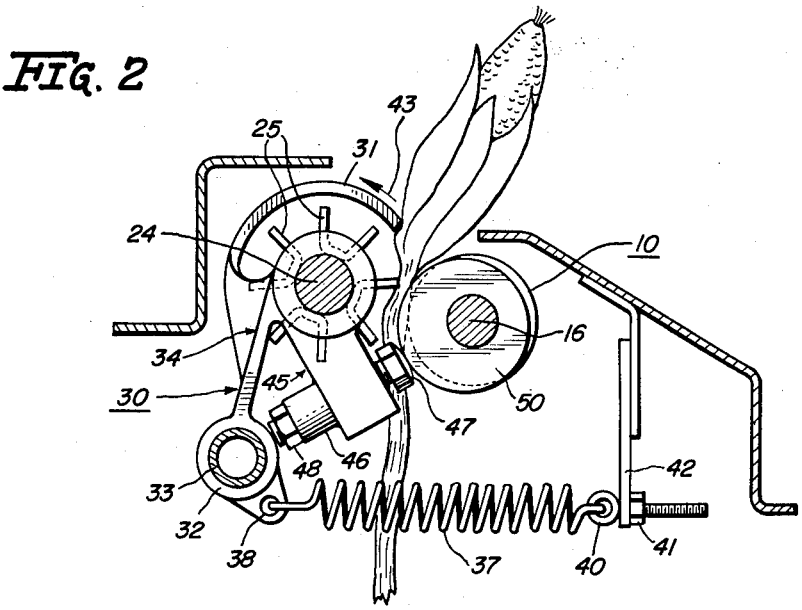
FIGURE 2 is a sectional view, taken on the line 2—2 and on a scale enlarged with respect to the scale of FIGURE 1, illustrating certain components of the invention.

In accordance with the inventive concept, and as better depicted in FIGURE 2, a casting 30 is provided which includes a stripper plate portion 31. The longitudinal extent of stripper plate portion 31 is approximately the same as that of fins 25 on roll 20. Stripper portion 31 extends arcuately and then downwardly to a hollow cylindrical portion 32, of the casting, and portion 32 is dimensioned to be indexed on a torque tube 33 as indicated. From the cylindrical portion 32 a first rocker arm 34 extends upwardly and is indexed around shaft 20 at the portion thereof nearer the drive gears, and a second rocker arm 35 (FIGURE 1) is provided nearer the other end of roll 20, being supported around roller bearings 36 mounted on roll 20. Thus the center of roll 20 is a pivot not only for the motion of this roll, but for the movement of casting 30 and torque tube 33.

A tension spring 37 is provided with one end thereof indexed in a suitable aperture 38 of casting 30, and the other end of the spring is received in the eye of a bolt 40, secured by a nut 41 or other means to a bracket portion 42. Accordingly, absent other considerations, the tendency of spring 37 is to urge the stripper plate portion 31 of the casting in the counterclockwise direction as depicted by arrow 43 in FIGURE 2.

As shown in the upper portion of FIGURE 1, casting 30 comprises a rear lever portion 45, extending downwardly and inclined as illustrated in FIGURE 2. Portion 45 includes and supports a cylindrical portion 46, tapped interiorly thereof to receive a bolt 47, secured by a nut 48 at the other end thereof within portion 46. An eccentric member 50 is affixed to the rear of guide roll 16 as indicated in FIGURE 2, and the action of spring 37 on the casting and bolt 47 is such as to cause the head of bolt 47 to bear against the outer periphery of eccentric member 50. It is evident that, by rotating bolt 47 and thus changing its linear alignment within portion 46 of the casting, the at-rest position of stripper plate 31 can be adjusted to any desired location. To facilitate such adjustment, it may be desired to provide a reference index or mark on a portion of guide roll 15 so that a given position of the eccentric member can be produced before the adjustment of the at-rest position of the stripper plate is made.

*Operation of the Invention*

Figure 3:
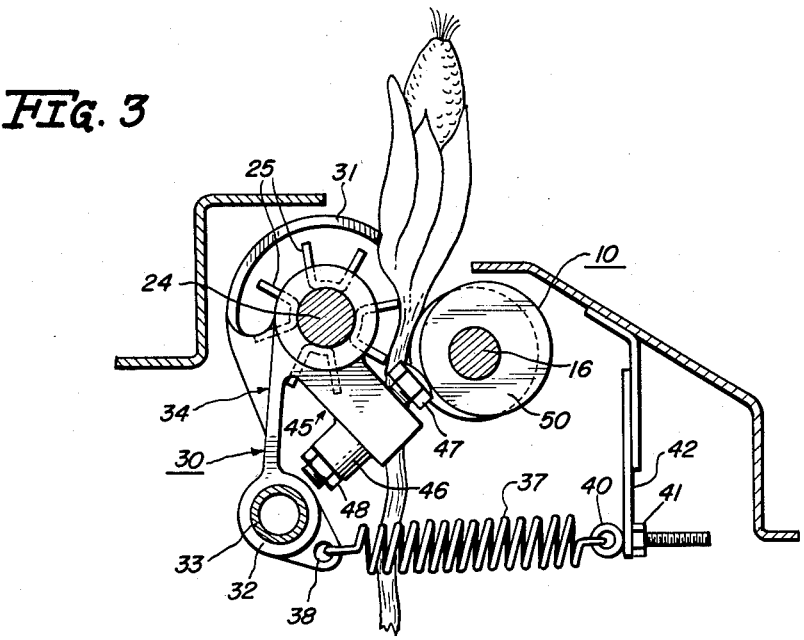
FIGURE 3 is a view similar to that of FIGURE 2 but with certain of the components of the invention displaced to other positions.

As drive is provided over sprocket 28 to effect oppositely-directed angular displacement of rolls 10 and 20 in a manner already explained, the cyclical movement of eccentric 50 on shaft 16 effects a related cyclical displacement of bolt 47, and thus of the entire casting 34. Accordingly, as the casting is displaced the stripper plate portion 31 thereof is cyclically displaced from a first position where there is a minimum lateral extent between the edge of the stripper plate 31 and the outer portion of guide roll 10 (i.e., minimum aggressive exposure), and a second position in which such displacement reaches the maximum lateral extent (maximum aggressive exposure). Such movement effectively varies the aggressive area of the stripping or guide roll 20 which can act upon the butt of the ear of corn as the stalk is fed downwardly between the rolls as indicated in FIGURE 2. For example, in FIGURE 2, the position of aggressive exposure is at a minimum and, with the stripper plate displaced to the position shown in FIGURE 3, there is considerably greater aggressive exposure to the corn ears. Thus the structure of the invention effectively brings the ears of corn as close as possible to the aggressive elements of the stalk feeding rolls, and prevents the ear from actually touching the rolls and thus obviates damage. The inventive structure reduces the shelling that is encountered with conventional stripper plates, while retaining the trash removing ability of the conventional or open snapping rolls. In a sense, the ears of corn can be considered as held in dynamic suspension, maintained away from the aggressive stalk feeding roll but permitted to approach sufficiently close so that an effective snapping and trash removal operation is obtained.

Figure 4:
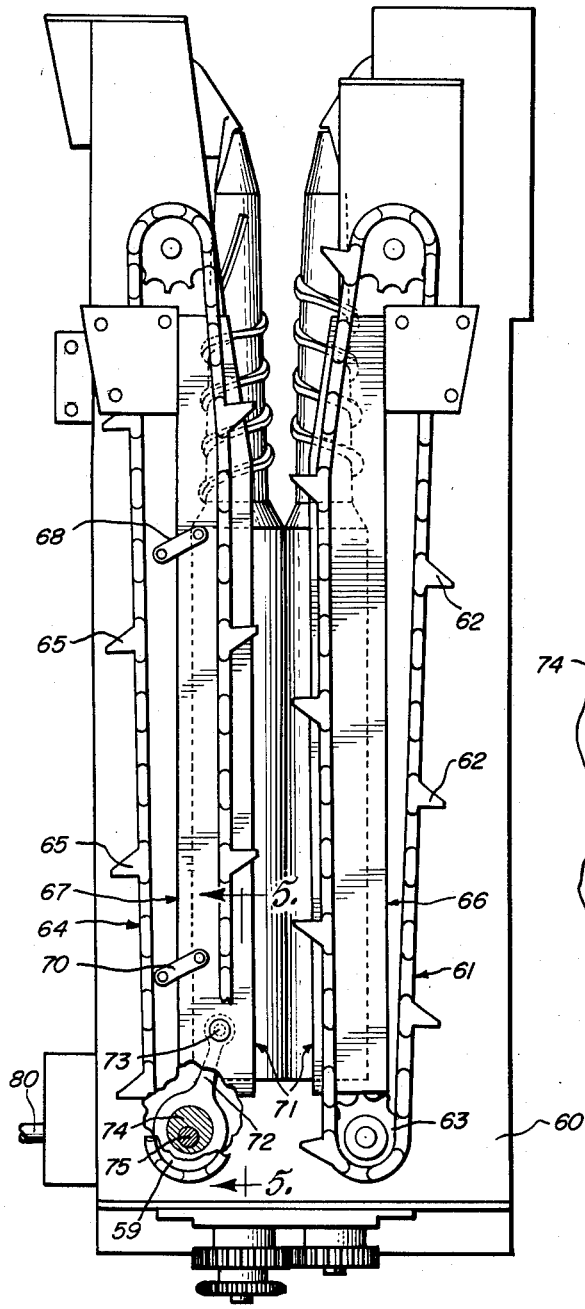
FIGURE 4 is a partial top view depicting another embodiment of the invention.

In another embodiment of the invention as shown in FIGURE 4, a corn picking or snapping arrangement includes a support plate 60, and conventional elements illustrated include a first gathering chain 61 having lugs 62 affixed thereto and journaled around a sprocket 63, and a second gathering chain 64 having a plurality of lugs 65 affixed thereto and journaled around another sprocket 59. A conventional stripper plate 66 is positioned as indicated.

In accordance with the inventive principles, a second stripper plate 67 is coupled over a pair of rocker links 68 and 70 to support plate 60 thereby to afford an arcuate or swinging movement of the second stripper plate which effectively varies the lateral extent of the material feeding slot 71 defined between the adjacent portions of stripper plates 66 and 67.

Figure 5:
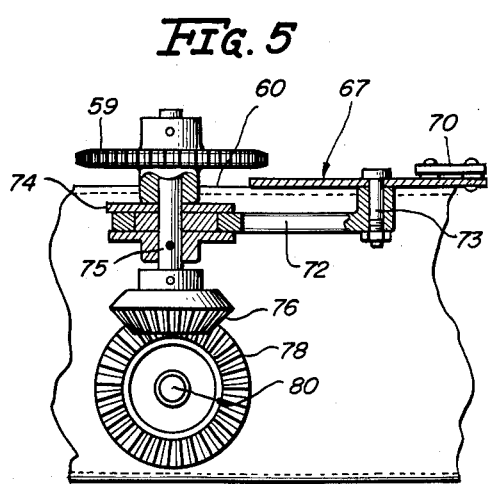
FIGURE 5 is a partial sectional view, taken along the line 5—5 of FIGURE 4, useful in explaining the second embodiment of the invention.

As better illustrated in FIGURE 5, the swinging motion of stripper plate 67 is provided over connecting rod 72, coupled by a bolt means 73 or other pivotal connector to stripper plate 67 and coupled at its other end to the periphery of an eccentric member 74 affixed to a shaft 75. A bevel gear 76 affixed to shaft 75 meshes with a bevel gear 78 positioned on a shaft 80, to which a conventional pulley-and-belt arrangement (not shown) can be coupled in well known manner. With movement of shaft 80, shaft 75 is driven to rotate the eccentric unit 74 and effect a related displacement of connecting rod 72, thereby moving stripper plate 67 in a swinging motion which cyclically varies the effective lateral distance between the adjacent edges of stripper plates 66 and 67.

It will be apparent to those skilled in the art that, if desired, a related cyclical displacement can be provided for stripper plate 66, thereby to effect a substantially larger variation in the material feeding slot width with a given input motion. Alternately, another adjustment can be provided on stripper plate 66 to effect the adjustment thereof when the equipment is de-energized, thereby to afford a reference spacing as desired to accommodate different crop conditions.

While only particular embodiments of the invention have been disclosed and illustrated, it is apparent that modifications and alterations may be made therein, and it is the intention in the appended claims to cover all such modifications and alterations as may fall within the true spirit and scope of the invention.

What is claimed is:
1. In a corn picking apparatus, the combination of:
a first generally cylindrical corn feeding roll;
means, including a second generally cylindrical corn feeding roll positioned adjacent said first roll, for defining with said first roll a stalk feeding slot of given lateral extent;
aggressive means affixed to at least a portion of one of said rolls to assist in snapping the ears from the stalks as fed through said slot;
means for effecting concomitant rotation of said first and second rolls to snap the ears from the stalks;
a stripper plate, positioned adjacent one of said rolls, mounted for oscillating movement about an axis proximate the axis of one of the rolls to vary the effective lateral extent of said material feeding slot;
and means for effecting a cyclical variation of the position of said movable stripper plate to vary the aggressive exposure during the snapping process.

2. For use with a corn picking apparatus:
a first generally cylindrical corn feeding roll;
means, including a second generally cylindrical corn feeding roll having aggressive means affixed to at least a portion thereof to assist in snapping the ears from the stalks, positioned adjacent said first roll for defining therewith a stalk feeding slot of given lateral extent;
a casting, including a first portion comprising an arcuate stripper plate, a second portion comprising journal means, and a third portion interconnecting said first and second portions with said second portion journaled around one of said corn feeding rolls to provide a reference pivot axis therefor;
and eccentric means, affixed to the other of said corn feeding rolls and positioned to engage and displace said casting, thereby to effect a cyclical displacement of said stripper plate portion as a function of angular displacement of said other corn feeding roll and concomitantly vary the aggressive exposure to the ears of corn as the stalks are fed through the material feeding slot.

3. For use with a corn picking apparatus:
a first generally cylindrical corn feeding roll;
means, including a second generally cylindrical corn feeding roll having radial fins affixed to at least a portion thereof to assist in positively engaging the stalks, positioned adjacent said first roll for defining therewith a stalk feeding slot of given lateral extent;
a casting, including a central portion comprising an arcuate stripper plate, end portions comprising journal means, and a lever portion, said end portions being journaled around one of said corn feeding rolls to provide a reference pivot axis therefor;
and eccentric means, affixed to the other of said corn feeding rolls and positioned to engage and displace said lever portion of the casting, thereby to effect a cyclical displacement of said stripper plate portion as a function of the angular displacement of said other corn feeding roll and concomitantly vary the aggressive exposure of the radial ribs to the stalks.

4. In a corn picking apparatus having a pair of stalk feeding rolls and a pair of stripper plates, each of said stripper plates disposed over at least a portion of one of the rolls and the stripper plates collectively defining a stalk feeding slot, the improvement which comprises:
means coupled to one of said stripper plates for affording oscillating movement of said one stripper plate about an axis proximate the axis of one of the rolls with at least a component of such movement being effective to vary the effective lateral extent of the stalk feeding slot;
and means, coupled to said one stripper plate, for effecting a cyclical displacement thereof about said reference location and thereby effecting a related cyclical variation in the lateral extent of said stalk feeding slot.

5. In a corn snapping unit having a support plate, a pair of stalk feeding rolls, and a pair of stripper plates disposed over said rolls to define between said stripper plates a stalk feeding slot;
link means intercoupling one of said stripper plates and said support plate, thereby to afford oscillating movement of said one stripper plate about an axis proximate the axis of one of the rolls with respect to said support plate, at least a component of said movement being effective to vary the effective lateral extent of the stalk feeding slot;
and means, coupled to said one stripper plate, for effecting a cyclical displacement of said one stripper plate and thereby a related cyclical variation in the effective lateral extent of the material feeding slot.

References Cited in the file of this patent
UNITED STATES PATENTS
867,893    Metcalf _____ Oct. 8, 1907